US008982592B2

(12) United States Patent
Tan et al.

(10) Patent No.: US 8,982,592 B2
(45) Date of Patent: Mar. 17, 2015

(54) MAXIMUM POWER POINT TRACKING FOR POWER CONVERSION SYSTEM AND METHOD THEREOF

(75) Inventors: Zhuohui Tan, Shanghai (CN); Xueqin Wu, Shanghai (CN); Xinhui Wu, Shanghai (CN); Maozhong Gong, Shanghai (CN)

(73) Assignee: General Electric Company, Schenectady, NY (US)

( * ) Notice: Subject to any disclaimer, the term of this patent is extended or adjusted under 35 U.S.C. 154(b) by 48 days.

(21) Appl. No.: 13/560,070

(22) Filed: Jul. 27, 2012

(65) Prior Publication Data

US 2013/0027997 A1    Jan. 31, 2013

(30) Foreign Application Priority Data

Jul. 29, 2011   (CN) .......................... 2011 1 0217137

(51) Int. Cl.
*H02M 7/537*    (2006.01)
*H02J 3/38*    (2006.01)
(Continued)

(52) U.S. Cl.
CPC . *H02J 3/385* (2013.01); *G05F 1/67* (2013.01); *H02M 7/48* (2013.01); *Y02E 10/58* (2013.01); *H02M 2001/007* (2013.01)
USPC ............................................ 363/95; 363/131

(58) Field of Classification Search
USPC ......... 323/205, 207, 212, 215, 217, 219, 906; 363/2, 40, 65, 71, 95, 97, 98, 131, 132, 363/133, 140; 307/51, 52, 62, 82
See application file for complete search history.

(56) References Cited

U.S. PATENT DOCUMENTS 5,268,832 A    12/1993   Kandatsu
6,229,278 B1 *   5/2001   Garces et al. ................. 318/801
(Continued)

FOREIGN PATENT DOCUMENTS

DE    19638880 C1   5/1998
EP    2328262 A2    6/2011
(Continued)

OTHER PUBLICATIONS

Kerekes et al., "MPPT Algorithm for Voltage Controlled PV Inverters", 11th International Conference on Optimization of Electrical and Electronic Equipment, pp. 427-432, May 22-24, 2008.
(Continued)

*Primary Examiner* — Adolf Berhane
*Assistant Examiner* — Nusrat Quddus
(74) *Attorney, Agent, or Firm* — GE Global Patent Operation; Peter T. DiMauro

(57) ABSTRACT

An exemplary power conversion system comprises an MPPT unit, a DC bus, a power converter, and a converter controller. The MPPT unit receives a feedback current signal and a feedback voltage signal from a power source and generates an MPPT reference signal based at least in part on the feedback current and voltage signals. The DC bus receives DC power from the power source. The power converter converts the DC power on the DC bus to AC power. The converter controller receives the MPPT reference signal from the MPPT unit and an output power feedback signal measured at an output of the power converter; generates control signals for AC power regulation and maximum power extraction based at least in part on the MPPT reference signal and the output power feedback signal; and sends the control signals to the power converter.

14 Claims, 9 Drawing Sheets

(51) Int. Cl.
*G05F 1/67* (2006.01)
*H02M 7/48* (2006.01)
*H02M 1/00* (2006.01)

(56) References Cited

U.S. PATENT DOCUMENTS

| | | | |
|---|---|---|---|
| 6,429,546 B1* | 8/2002 | Ropp et al. | 307/31 |
| 7,193,872 B2* | 3/2007 | Siri | 363/95 |
| 7,348,756 B2* | 3/2008 | Ma et al. | 318/803 |
| 7,889,527 B2* | 2/2011 | Ohshima et al. | 363/97 |
| 7,964,991 B2* | 6/2011 | Siri | 307/53 |
| 8,014,181 B2* | 9/2011 | Tan et al. | 363/74 |
| 8,295,063 B2* | 10/2012 | Gong et al. | 363/40 |
| 8,310,214 B2* | 11/2012 | Garces Rivera et al. | 323/207 |
| 8,547,715 B2* | 10/2013 | Yuan et al. | 363/98 |
| 2007/0223258 A1* | 9/2007 | Lai et al. | 363/37 |
| 2009/0216387 A1* | 8/2009 | Klein | 700/296 |
| 2009/0279336 A1* | 11/2009 | Erdman et al. | 363/131 |
| 2009/0279936 A1* | 11/2009 | Kuykendall | 401/6 |
| 2010/0008119 A1* | 1/2010 | O'Brien et al. | 363/132 |
| 2010/0134076 A1* | 6/2010 | Cardinal et al. | 323/207 |
| 2010/0142237 A1* | 6/2010 | Yuan et al. | 363/97 |
| 2010/0157638 A1* | 6/2010 | Naiknaware et al. | 363/131 |
| 2010/0195361 A1* | 8/2010 | Stem | 363/132 |
| 2010/0219690 A1 | 9/2010 | Femia et al. | |
| 2010/0236612 A1 | 9/2010 | Khajehoddin et al. | |
| 2012/0314467 A1* | 12/2012 | O'Brien et al. | 363/131 |
| 2013/0027997 A1* | 1/2013 | Tan et al. | 363/95 |
| 2013/0207622 A1* | 8/2013 | Yuan et al. | 323/207 |

FOREIGN PATENT DOCUMENTS

| | | |
|---|---|---|
| WO | 2010121211 A2 | 10/2010 |
| WO | 2011073938 A2 | 6/2011 |

OTHER PUBLICATIONS

Search Report and Written Opinion from corresponding EP Application No. 12178220.5-1242 dated Nov. 26, 2011.
Samangkool et al., "Maximum Power Point Tracking Using Neural Networks for Grid-Connected Photovoltaic System", pp. 1-4, Nov. 16, 2005.
Lavanya et al., "A Simple Controller using Line Commutated Inverter with Maximum Power Tracking for Wind-Driven Grid-Connected Permanent Magnet Synchronous Generators", pp. 1-6, Dec. 1, 2006.
Beck, "A photovoltaic grid connected inverter with current source characteristics and maximum power tracking", pp. 1-4, Sep. 10, 2007.

* cited by examiner

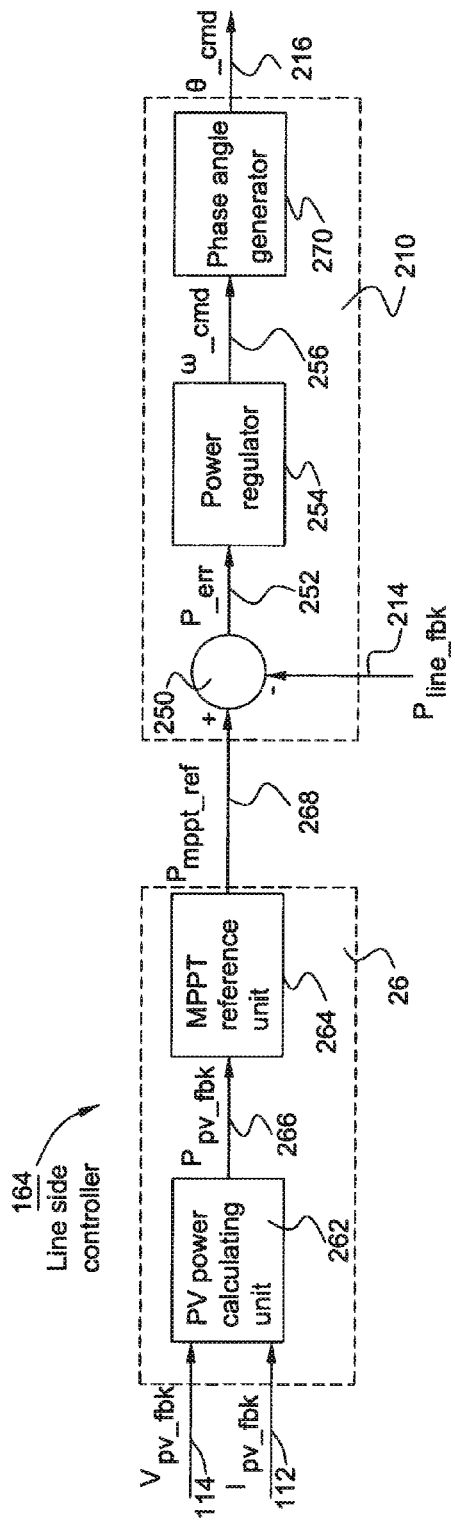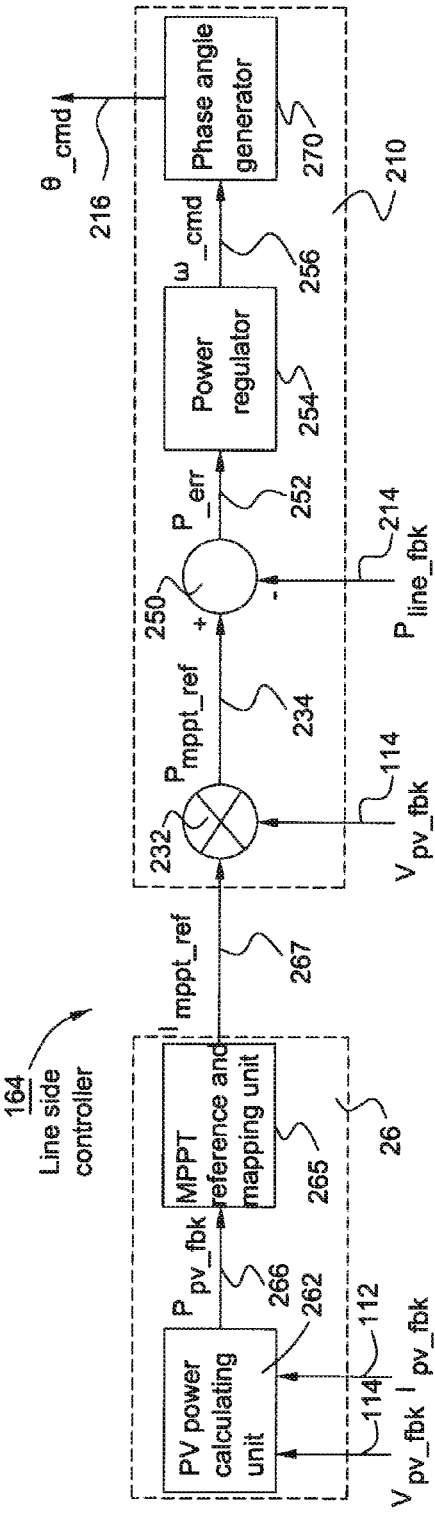
FIG. 3
FIG. 4

MAXIMUM POWER POINT TRACKING FOR POWER CONVERSION SYSTEM AND METHOD THEREOF

BACKGROUND

Embodiments of the disclosure relate generally to power conversion systems and methods for converting and providing electrical power to feed an electrical system and, more particularly, to power conversion systems and methods with improved maximum power point tracking capability.

Renewable power, such as solar power generated by solar power generation systems, is becoming a larger source of energy throughout the world. A typical solar power generation system includes one or more photovoltaic arrays (PV arrays) having multiple interconnected solar cells. The solar cells of the PV arrays convert solar energy into DC power. In order to interface the output of the PV arrays to a power grid, a solar power converter is typically used to change the DC power from the PV arrays into AC power to feed a power grid.

Various solar power converter configurations exist for converting the DC power output from PV arrays into AC power. One implementation of a solar power converter has two stages including a DC-DC converter stage and a DC-AC converter stage. The DC-DC converter controls the flow of DC power from the PV arrays onto a DC bus. The DC-AC converter stage converts the DC power supplied to the DC bus into AC power that can be output to the power grid. Existing solar power converters further utilize power converter controller to regulate the DC-DC converter and the DC-AC converter to compensate for various system variables, such as DC bus voltage and AC grid voltage and frequency.

Due to inherent non-linear characteristics solar power sources, it is not easy to accurately predict the optimum operating point of solar power sources. Thus, almost all existing solar power converter controls are configured with a maximum power point tracking (MPPT) function to ensure maximum power is extracted from the solar power source during the solar power generation process. The MPPT function may be achieved by implementing one of a variety of MPPT algorithms such as perturbation and observation (P&O) algorithms and incremental conductance algorithms, for example. When the solar power conversion system is connected to a power grid, implementing such conventional MPPT algorithms have some limitations. One challenge is that a power imbalance may occur at the DC bus from the MPPT output power being larger than the line side output power. Thus, over-voltage problems will be present at the DC bus if the power conversion system is not able to respond quickly to deal with the additional power generated from the power source. The power imbalance challenge may become severe when the power conversion system is connected to a weak power grid which may have large variations of voltage and frequency.

Therefore, it is desirable to provide systems and methods to address the above-mentioned problems.

BRIEF DESCRIPTION

In accordance with one embodiment disclosed herein, a power conversion system is provided. The power conversion system comprises a maximum power point tracking (MPPT) unit, a DC bus, a power converter, and a converter controller. The MPPT unit receives a feedback current signal and a feedback voltage signal from a power source and generates an MPPT reference signal based at least in part on the feedback current signal and the feedback voltage signal. The DC bus receives DC power from the power source. The power converter converts the DC power on the DC bus to alternating current (AC) power. The converter controller receives the MPPT reference signal from the MPPT unit and an output power feedback signal measured at an output of the power converter; generates control signals for AC power regulation and maximum power extraction based at least in part on the MPPT reference signal and the output power feedback signal; and sends the control signals to the power converter.

In accordance with another embodiment disclosed herein, a method of operating a power conversion system is provided. The method comprises generating a maximum power point tracking (MPPT) reference signal based at least in part on a feedback current signal and a feedback voltage signal measured at an output of a power source; generating control signals based at least in part on the MPPT reference signal and an output power feedback signal measured at an output of the power conversion system; and applying the control signals to a power converter to enable maximum power to be extracted from the power source while mitigating power imbalance conditions.

In accordance with yet another embodiment disclosed herein, a solar power conversion system is provided. The solar power conversion system comprises a maximum power point tracking (MPPT) unit, a DC bus, a line side converter, and a line side controller. The MPPT unit receives a feedback current signal and a feedback voltage signal from a photovoltaic (PV) power source and generates an MPPT reference signal based at least in part on the feedback current signal and the feedback voltage signal. The DC bus receives DC power from the PV power source. The line side converter is coupled to the DC bus for converting the DC power on the DC bus to the AC power. The line side controller generates control signals for AC power regulation and maximum power extraction, based at least in part on the MPPT reference signal and an output power feedback signal measured at an output of the line side converter, and supplies the control signals to the line side converter.

DRAWINGS

These and other features, aspects, and advantages of the present disclosure will become better understood when the following detailed description is read with reference to the accompanying drawings in which like characters represent like parts throughout the drawings, wherein:

FIG. 3 is a detailed control diagram of an active power regulator in association with an MPPT circuit shown in FIG. 2 in accordance with an exemplary embodiment of the present disclosure.

FIG. 4 is a detailed control diagram of an active power regulator in association with an MPPT circuit shown in FIG. 2 in accordance with another exemplary embodiment of the present disclosure.

DETAILED DESCRIPTION

Figure 1:
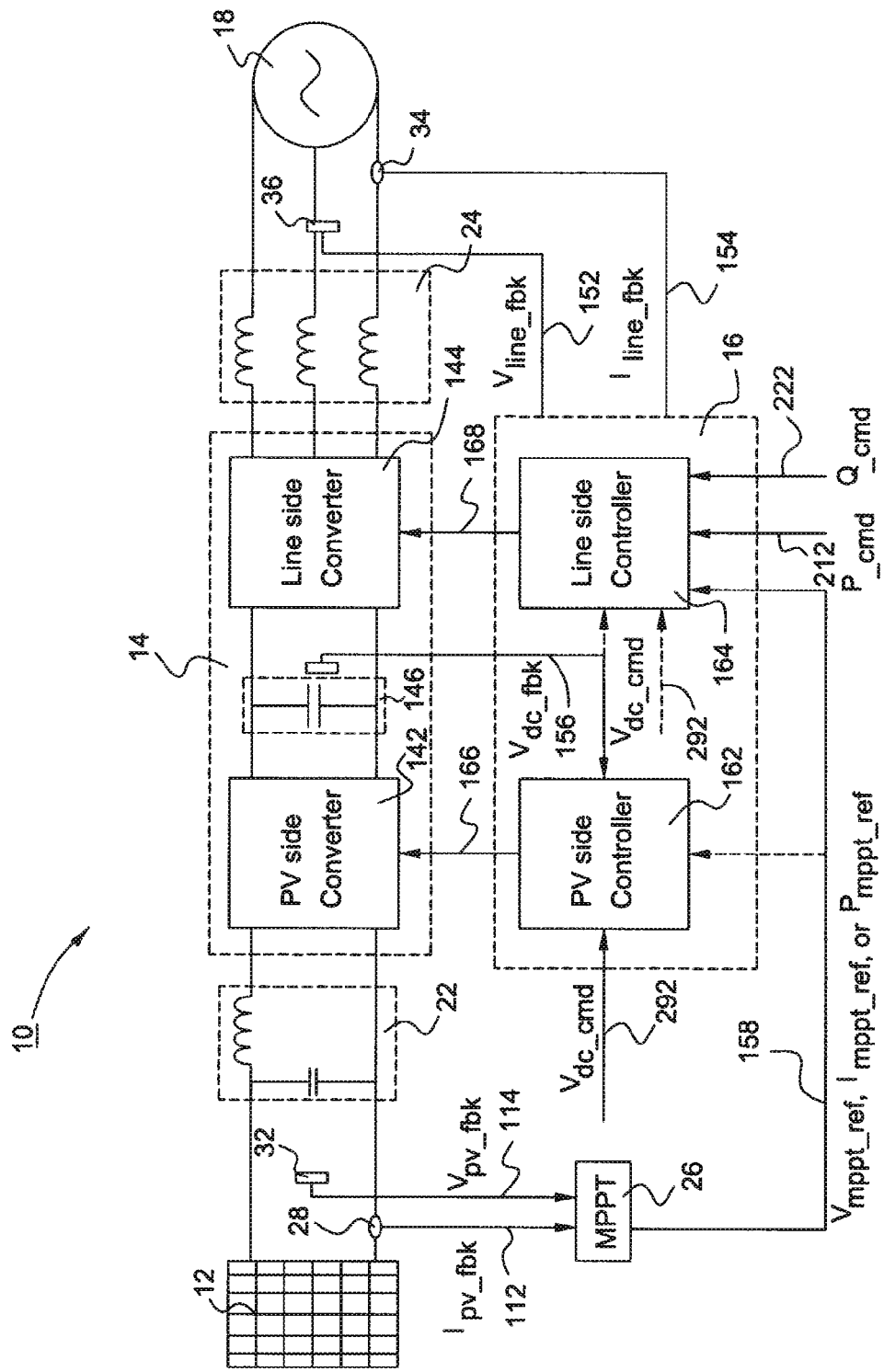
FIG. 1 is a schematic block diagram of a solar power conversion system in accordance with an exemplary embodiment of the present disclosure.

Embodiments disclosed herein relate generally to operating power conversion systems with improved maximum power point tracking (MPPT) capability. As used herein, "MPPT capability" refers to a control structure or scheme implemented in software or hardware to find an operating point of a solar power source where maximum power can be extracted from the solar power source. More particularly, the implementation of the MPPT capability described herein is based on a voltage source control structure or scheme. As used herein, "voltage source control structure or scheme" refers a control embodiment wherein one of the primary control parameters is AC voltage including a voltage magnitude command and a phase angle command of the power conversion system. Furthermore, based on the voltage source control structure, the MPPT capability is implemented to ensure the MPPT power generation is coordinated with line side output power. Thus, the power conversion system can be implemented without using additional energy storage device which is typically present in a conventional solar power conversion system and is used for storing extra power generated from the solar power source.

One or more specific embodiments of the present disclosure will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Unless defined otherwise, technical and scientific terms used herein have the same meaning as is commonly understood by one of ordinary skill in the art to which this disclosure belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean either or all of the listed items. The use of "including," "comprising" or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect. Furthermore, the terms "circuit" and "circuitry" and "controller" may include either a single component or a plurality of components, which are either active and/or passive and are connected or otherwise coupled together (e.g., as one or more integrated circuit chips) to provide the described function.

FIG. 1 illustrates a block diagram of a power conversion system 10 in accordance with an exemplary embodiment of the present disclosure. Hereinafter, for better understanding the best mode of the present disclosure, the power conversion system 10 is illustrated and described as a solar power conversion system. However, a person having ordinary skill in the art will readily understand that one or more embodiments described herein should not be limited to solar applications as certain aspects of the disclosure can be applied in a similar manner to other power conversion systems, including fuel cell systems, wind power systems, and tidal power systems, for example.

In general, the solar power conversion system 10 includes a solar power converter 14 configured to interface between a solar power source 12 and a power grid 18. More specifically, the solar power converter 14 is configured to convert power in a form of direct current (DC) voltage or current (herein after referred to as DC power) generated from a solar power source 12 into power in the form of alternating current (AC) voltage or current (herein after referred to as AC power) suitable for feeding an electrical system shown as power grid 18. In one embodiment, the solar power source 12 may include one or more photovoltaic arrays (PV arrays) having multiple interconnected solar cells that can convert solar energy into DC power through the photovoltaic effect. In one embodiment, the electrical system 18 may comprise an AC power grid, and the solar power conversion system is configured for delivering three-phase AC power with suitable frequency and magnitude to the AC power grid 18.

In one implementation, the power converter 14 shown in FIG. 1 is based on a two-stage structure including a PV side converter 142 and a line side converter 144. The PV side converter 142 may comprise a DC-DC converter, such as a DC-DC boost converter, that steps up a DC voltage received from the power source 12 and outputs a higher DC voltage onto a DC bus 146. The DC bus 146 may include one or more capacitors coupled in parallel or in series for maintaining the voltage of the DC bus 146 at certain level, and thus the energy flow from the DC bus 146 to the power grid 18 can be managed. The line side converter 144 may comprise a DC-AC inverter that converts the DC voltage on the DC bus 146 to AC voltage suitable for feeding to the AC power grid 18. In other implementations, the power converter 14 may be based on a single stage converter structure including a DC-AC converter for converting DC voltage at a DC bus to AC voltage with suitable frequency and voltage magnitude to feed the power grid 18. In either the single or multistage embodiment, the power converter 14 is controlled to provide both AC power regulation and maximum power extraction. As used herein, "AC power regulation" means regulating the active power or reactive power output from the power converter according to active power or active power command signals, and "maximum power extraction" means dynamically moving the operating point of the solar power source to its highest point on the power curve (which may change in response to environmental changes such as irradiation and temperature changes) to have maximum amount of power output from the solar power source.

In one implementation, the power conversion system 10 shown in FIG. 1 further comprises a power converter controller 16 configured to regulate the PV power output from the solar power source 12 and regulate the active power or reactive power at the output of the line side converter 144. In one implementation, corresponding to the two-stage converter structure described above, the power converter controller 16 is configured to have a PV side controller 162 and a line side controller 164. The PV side controller 162 is configured to send PV side control signals 166 to the PV side converter 142 to regulate the PV power output from the solar power source 12 according to various command signals and feedback signals. The line side controller 164 is configured to send line side control signals 168 to the line side converter 144 to regulate the active power or reactive power output from the line side converter 144 according to various command signals and feedback signals. The PV side converter 142 may comprise any type of converter topology such as a half bridge converter, a full bridge converter, or a push-pull converter. The line side converter 144 may comprise any type of DC to AC converter topology such as a 2-level converter or a 3-level converter. The PV side converter 142 and the line side converter 144 may comprise a plurality of semiconductor switching devices (not shown), including but not limited to, integrated gate commutated thyristors (IGCTs) and insulated gate bipolar transistors (IGBTs). The switching devices are switched on and off in response to the PV side control signals 166 and the line side control signals 168 respectively. Although two controllers 162, 164 are illustrated, in other embodiments, a single controller may be used to control both the PV side converter 142 and the line side converter 144.

In one implementation, the power conversion system 10 shown in FIG. 1 may further comprise a PV side filter 22 having one or more capacitive and inductive elements for removing ripple components of the DC power output from the solar power source 12 and blocking ripple signals transmitted from the PV side converter 142 to the solar power source 12. The power conversion system 10 may further include a line side filter 24 having one or more inductive elements or capacitive elements (not shown) for removing harmonic signals for each phase of the three-phase AC power output from the line side converter 144.

In one implementation, the PV side controller 162 receives a DC voltage feedback signal 156 measured by a DC voltage sensor placed at the output of the DC bus 146. The PV side controller 162 further receives a DC voltage command signal 292. The PV side controller 162 adjusts the PV side control signals 166 according to the DC voltage feedback signal 156 and the DC voltage command signal 292 so as to control the DC voltage appearing at the DC bus 146. In alternative embodiments, as shown by dashed line 292 pointed to the line side controller 164, the line side controller 164 may be alternatively or additionally responsible for controlling the DC voltage appearing at the DC bus 146. More specifically, the line side controller 164 receives the DC voltage feedback signal 156 and the DC voltage command signal 292. In one embodiment, the line side controller 164 adjusts the line side control signals 168 according to a DC voltage error signal obtained by subtracting the DC voltage feedback signal 156 from the DC voltage command signal 292.

In one implementation, the power conversion system 10 shown in FIG. 1 further comprises a maximum power point tracking (MPPT) circuit 26. For purposes of illustration, the MPPT circuit 26 is shown to be located at the outside of the power converter controller 16. Alternatively, the MPPT circuit 26 may be configured within the power converter controller 16, or more specifically, configured within the PV side controller 162. In one embodiment, the MPPT circuit 26 may implement an MPPT algorithm to extract maximum power from the solar power source 12.

As shown in FIG. 1, the MPPT circuit 26 is in electrical communication with the solar power source 12, the PV side controller 162, and the line side controller 164. In normal operations, the MPPT circuit 26 receives a feedback DC current signal 112 and a feedback DC voltage signal 114 from the solar power source 12. The feedback DC current and voltage signals 112, 114 may be measured by a current sensor 28 and a voltage sensor 32 placed at the output of solar power source 12. The MPPT circuit 26 implements the MPPT algorithm and generates a number of reference signals 158, which may include current reference signals, voltage reference signals, or power reference signals, for example. In one embodiment, the reference signals 158 generated from the MPPT circuit 26 are supplied to the line side controller 164. In this case, the MPPT perturbation is added to the line side controller 164. The line side controller 164 adjusts the line side control signals 168 for the line side converter 144 according to the reference signals 158 to ensure maximum power is to be extracted from the solar power source 12. In addition, as the line side converter 144 is controlled according to the reference signals 158 from the MPPT circuit 26, the power output from the line side converter 144 and the power output from the solar power source 12 are coordinated such that at least the benefit of power balance can be achieved without having too much stress on the DC bus 146. In other embodiments, reference signals 158 generated from the MPPT circuit 26 can be optionally added to the PV side controller 162, which may have the advantage of providing a faster response to the MPPT perturbation.

Figure 2:
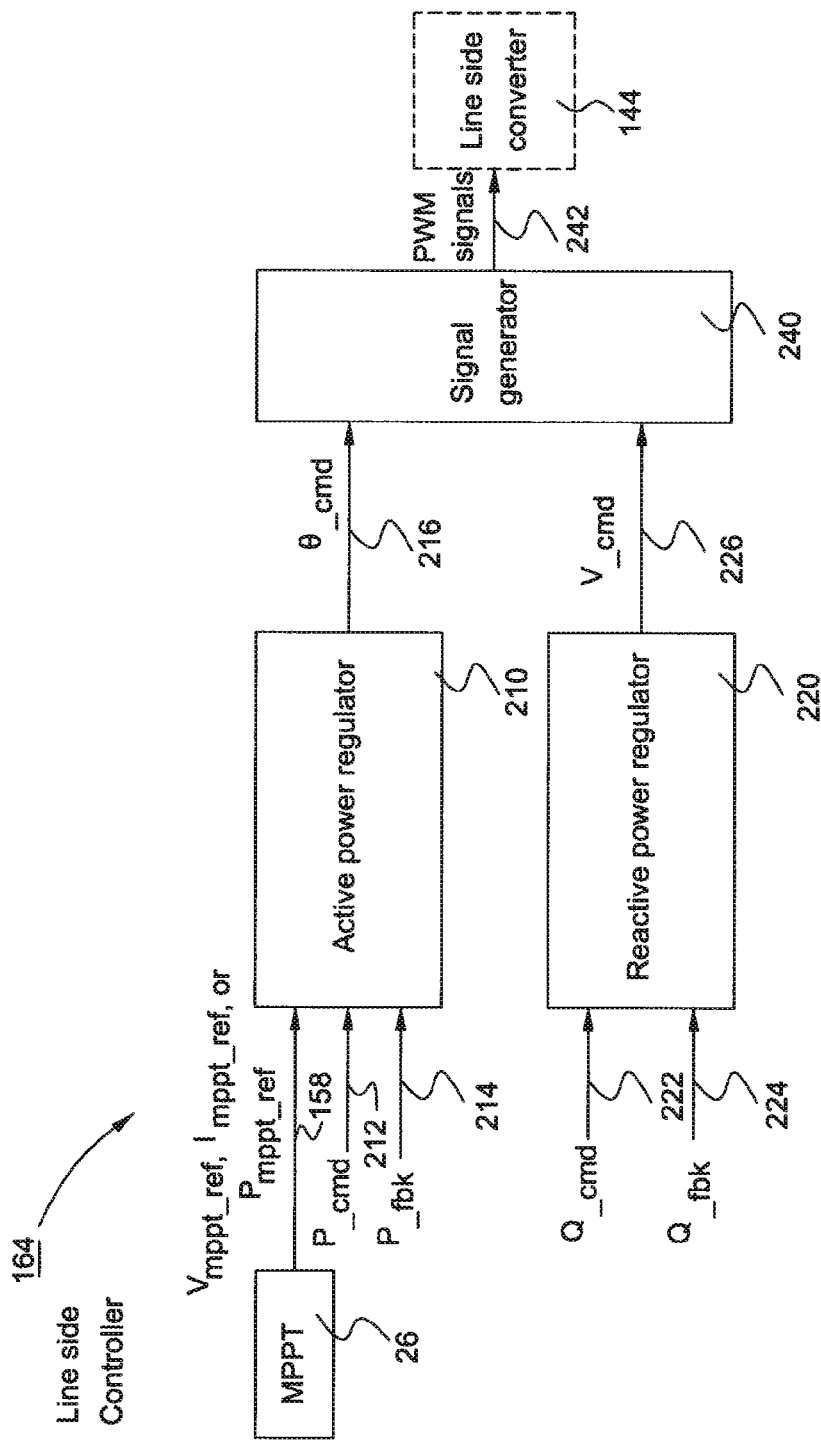
FIG. 2 is a control diagram implemented by a line side controller shown in FIG. 1 in accordance with an exemplary embodiment of the present disclosure.

FIG. 2 illustrates a part of an overall control diagram of the line side controller 164 in accordance with an exemplary embodiment of the present disclosure. The functional blocks illustrated in FIG. 2 can be implemented in hardware or software or a combination thereof. In practical applications, the line side controller 164 may be implemented by a microcontroller or a digital signal processor (DSP). In general, the line side controller 164 shown in FIG. 2 is constructed to have a voltage source control structure. Based on the voltage source control structure, actual active power and reactive power at the output of the line side converter 144 can be regulated according to commanded active and reactive power. In the illustrated embodiment, the line side controller 164 includes an active power regulator 210, a reactive power or VAR regulator 220, and a signal generator 240.

The active power regulator 210 shown in FIG. 2 is configured to regulate the active power output from the line side converter 144 according to commanded active power. More specifically, in one embodiment, the active power regulator 210 receives a power feedback signal 214 and an MPPT power command signal 212 and generates a phase angle command signal 216. The MPPT power command signal 212 represents the desired power to be delivered between the output terminal of the line side converter 144 (see FIG. 1) and the grid 18. The power feedback signal 214 is the actual measured power delivered between the output terminal of the line side converter 144 and the grid 18. In one embodiment, the power feedback signal 214 may be obtained by multiplying a feedback current signal 154 and a feedback voltage signal 152 which may be obtained, for example, from a current sensor 34 and a voltage sensor 36 placed between the line side converter 144 and the grid 18 (FIG. 1). In one embodiment, the phase angle command signal 216 represents a desired phase angle of the AC voltage output from the line side converter 144.

With continued reference to FIG. 2, the reactive power regulator 220 is configured to regulate the reactive power output from the line side converter 144 according to commanded reactive power. More specifically, in one embodiment, the reactive power regulator 220 receives a reactive power feedback signal 224 and a reactive power command signal 222 and generates a voltage magnitude command signal 226. The reactive power command signal 222 represents the desired reactive power delivered between the output at a point of common coupling (a point where the current sensor 34 and voltage sensor 36 are coupled to) and the grid 18 and may be dictated by a grid operator. The reactive power feedback signal 224 is the actual measured reactive power delivered between the output of the line side converter 144 and the grid 18. The reactive power feedback signal 224 may be obtained by multiplying a feedback current signal 154 and a feedback voltage signal 152 (see FIG. 1). The voltage magnitude command signal 226 represents a desired voltage magnitude of the AC voltage output from the line side converter 144. In one embodiment, the reactive power regulator 220 may comprise a summation element (not shown) for producing a reactive power error signal by subtracting the reactive power feedback signal 224 from the reactive power command signal 222. The reactive power regulator 220 may further comprise a VAR regulator and a voltage regulator (not shown) for generating the voltage magnitude command signal 226 using the resulting reactive power error signal.

With continued reference to FIG. 2, the signal generator 240 is configured for generating line side control signals 168 for the line side converter 144 according to the phase angle command signal 216 and the voltage magnitude command signal 226. In one implementation, the signal generator 240 may be a pulse width modulation (PWM) signal generator for generating the line side control signals 168 in PWM pattern for the line side converter 144.

FIG. 3 illustrates a more detailed control diagram of the MPPT circuit 26 and the active power regulator 210 shown in FIG. 2 in accordance with one embodiment of the present disclosure. In the illustrated embodiment, the MPPT circuit 26 includes a PV power calculating unit 262 and an MPPT reference unit 264. The PV power calculating unit 262 is used to calculate an actual power currently obtained from the solar power source 12 by multiplying the DC current signal 112 and the DC voltage signal 114. The MPPT reference unit 264 is used to receive the feedback PV power signal 266 and generate an MPPT power reference signal 268 based at least on the feedback PV power signal 266. More specifically, the MPPT power reference signal 268 is generated by comparing the feedback PV power signal 266 with a previous reference power signal. As used herein, "previous reference power signal" is a signal generated from MPPT algorithm implementation and is used to indicate a target power expected to be extracted from the solar power source 10. If an absolute difference between the feedback PV power and the previous reference power is determined to be smaller than a predetermined threshold value, the MPPT power reference signal 268 is generated by adding the currently obtained feedback PV power with a predetermined power step value. As mentioned here, "predetermined power step value" can be a fixed power value or a variable power value depending on system requirements and applications. If the absolute difference between the feedback PV power and the previous reference power is determined to be larger than the predetermined threshold value, the MPPT power reference signal 268 is generated by subtracting a predetermined power step value from the currently obtained feedback PV power.

As further shown in FIG. 3, the MPPT power reference signal 268 generated from the MPPT circuit 26 is supplied to a summation element 250 of the active power regulator 210. The summation element 250 subtracts the power feedback signal 214 from the MPPT power reference signal 268 and provides a power error signal 252 representing a difference between the MPPT power reference signal 268 and the power feedback signal 214. The power error signal 252 is supplied to a power regulator 254 of the active power regulator 210, wherein the power regulator 254 generates a frequency command signal 256 according to the power error signal 252 designed to drive the power error signal towards zero. The frequency command signal 256 is supplied to a phase angle generator 270 of the active power regulator 210, wherein the phase angle generator 270 generates a phase angle command signal 216 according to the frequency command signal 256. In one implementation, the phase angle generator 270 may use integrating elements for integrating the frequency command signal 256 to generate the phase angle command signal 216.

FIG. 4 illustrates a more detailed control diagram of the MPPT circuit 26 and the active power regulator 210 shown in FIG. 2 in accordance with another embodiment of the present disclosure which further includes an MPPT reference and mapping unit 265 configured to generate an MPPT current reference signal 267 according to the PV power feedback signal 266 calculated by the PV power calculating unit 262. Further, a multiplication element 232 is included in the active power regulator 210, wherein the multiplication element 232 produces an MPPT power reference signal 234 by multiplying the MPPT current reference signal 267 and the feedback PV voltage signal 114. Similar to the content described above with respect to FIG. 3, the MPPT power reference signal 234 is then used for generation of the frequency command signal 256 and the phase angle command signal 216.

Figure 5:
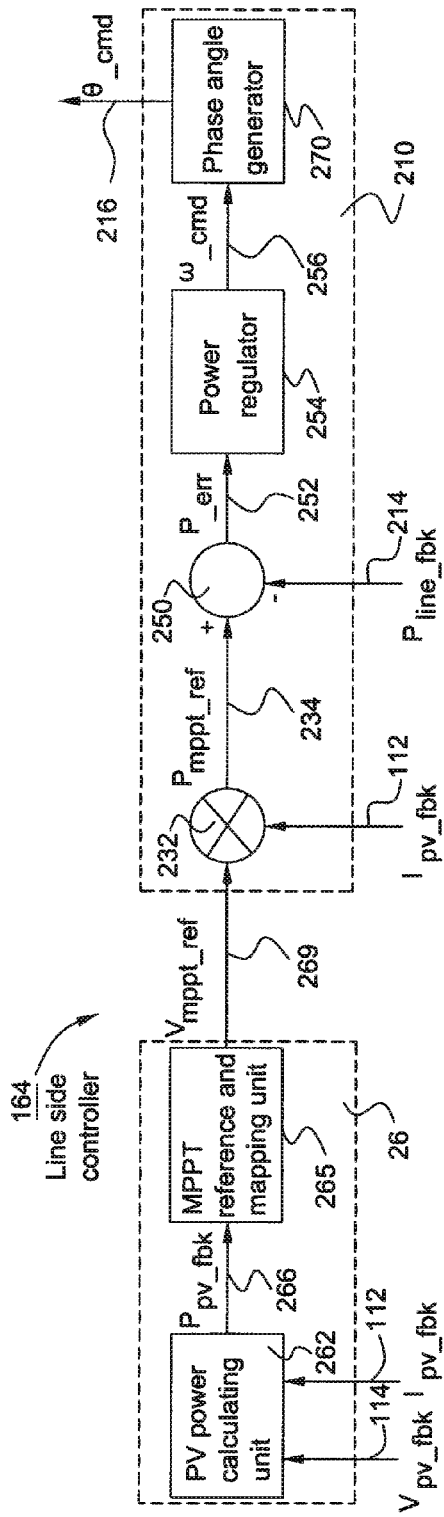
FIG. 5 is a detailed control diagram of an active power regulator in association with an MPPT circuit shown in FIG. 2 in accordance with yet another exemplary embodiment of the present disclosure.

FIG. 5 illustrates a more detailed control diagram of the MPPT circuit 26 and the active power regulator 210 shown in FIG. 2 in accordance with yet another embodiment of the present disclosure. In the control diagram illustrated in FIG. 5, the MPPT reference and mapping unit 265 in the MPPT circuit 26 is configured to generate an MPPT voltage reference signal 269 according to the PV power feedback signal 266. The MPPT voltage reference signal 269 is multiplied with the PV current feedback signal 112 by the multiplication element 232 for generation of the MPPT PV power reference signal 234, which is further used for generation of the frequency command signal 256 and the phase angle command signal 216.

Figure 6:
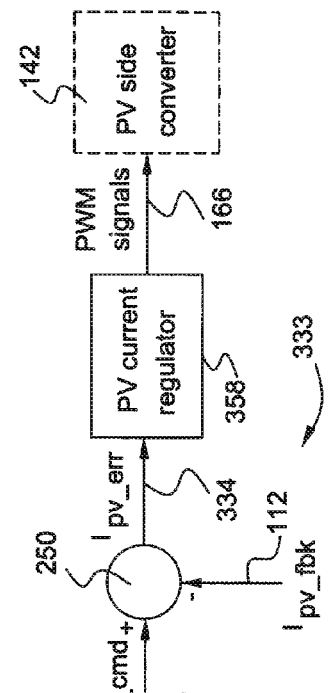
FIG. 6 is a detailed control diagram of a PV side controller shown in FIG. 1 in accordance with an exemplary embodiment of the present disclosure.

FIG. 6 illustrates a detailed control diagram of the PV side controller 162 shown in FIG. 1 in accordance with an embodiment of the present disclosure. As described above, in one aspect, the PV side controller 162 is responsible for regulating the DC voltage appearing at the DC bus 146. The PV side controller 162 includes a first summation element 320, a DC voltage controller 324, a mapping unit 328, a second summation element 331, and a PV current regulator 358. As show in FIG. 6, in the outer voltage loop 321, a DC voltage feedback signal 156 is supplied to the first summation element 320 and is subtracted from the DC voltage command signal 292 to produce a DC voltage error signal 322 representing a difference between the DC voltage command signal 292 and the DC voltage feedback signal 156. The DC voltage command signal 292 represents a desired DC voltage to be achieved at the DC bus 146. The DC voltage error signal 322 is regulated by the DC voltage controller 324 to generate a PV power command signal 326. According to the PV power command signal 326, a PV current command signal 332 is mapped by the mapping unit 328. As used herein, "mapped" refers to obtaining a PV current command signal on a power curve according to a PV power command signal. As further shown in FIG. 6, in the inner current loop 333, the PV current feedback signal 112 is supplied to the second summation element 331 and is subtracted from the PV current command signal 332. The resulting PV current error signal 334 from the second summation element 331 is regulated by the PV current regulator 358 to generate the PV side control signals 166 for the PV side converter 142.

Figure 7:
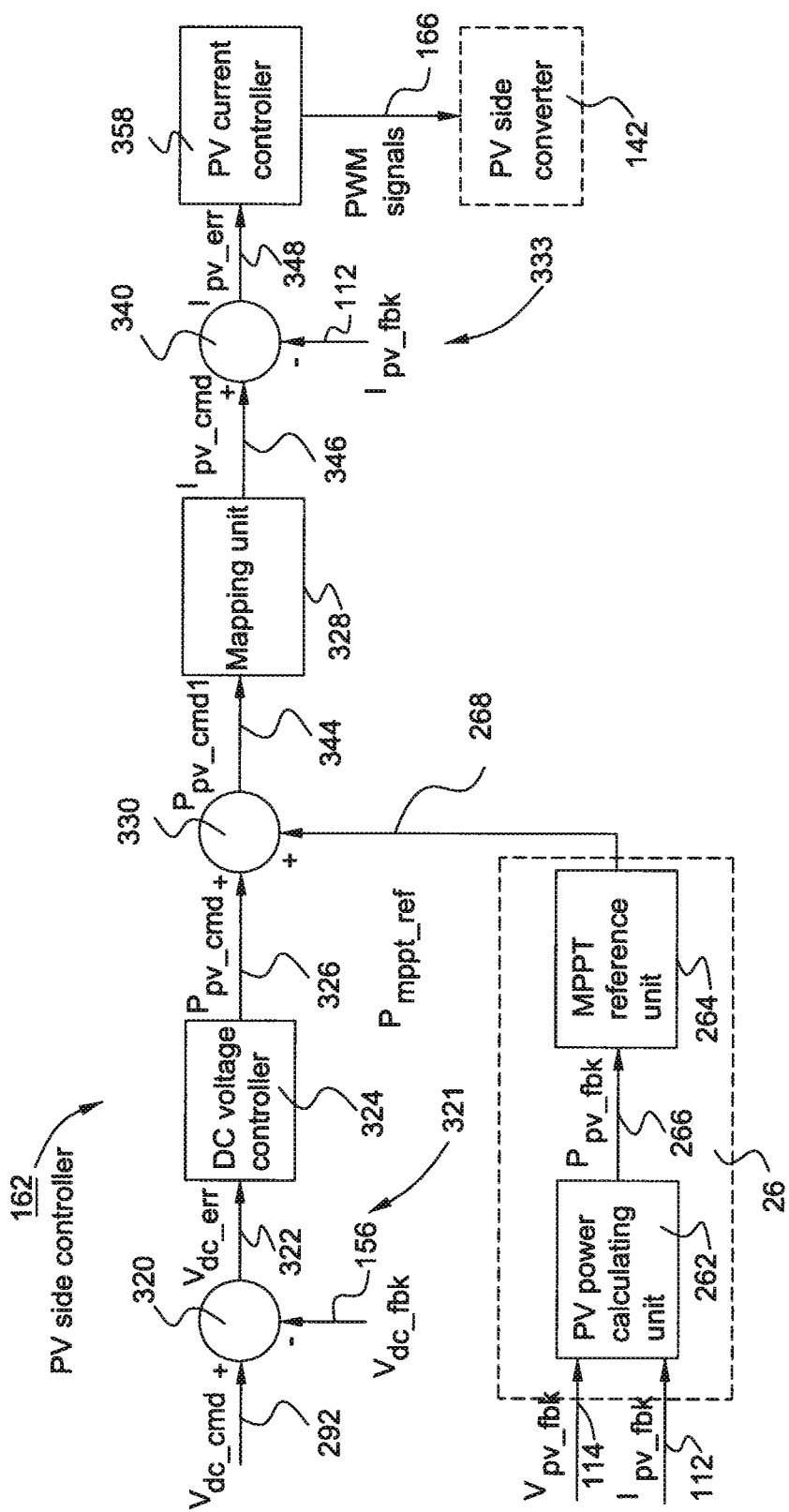
FIG. 7 is a detailed control diagram of a PV side controller shown in FIG. 1 in accordance with another exemplary embodiment of the present disclosure.

FIG. 7 illustrates a detailed control diagram of the PV side controller 162 shown in FIG. 1 in accordance with another embodiment of the present disclosure. In the control diagram illustrated in FIG. 7, a feed-forward control is further included. More specifically, in one embodiment, an MPPT power reference signal 268 generated from the MPPT circuit 26 is added to the outer voltage loop 321. In one embodiment, the MPPT power reference signal 268 is generated by the MPPT reference unit 264 according to the PV power feedback signal 266 as discussed above with respect to FIG. 3. The MPPT power reference signal 268 is supplied to a third summation element 330 in the outer loop 321. The MPPT power reference signal 268 is combined with the PV power command signal 326 to produce a combined PV power command signal 344. Similar to the content describe above with respect to FIG. 6, the combined PV power command signal 344 is then used for generation of the PV side control signals 166. It can be understood that by adding feed-forward control, the MPPT control can respond more quickly to find the optimum operating point of the solar power source 12 (FIG. 1). Further, with the feed-forward control, further coordination is provided to the PV side controller 162 and the line side controller 164, such that the DC bus 146 can have less voltage stress.

Figure 8:
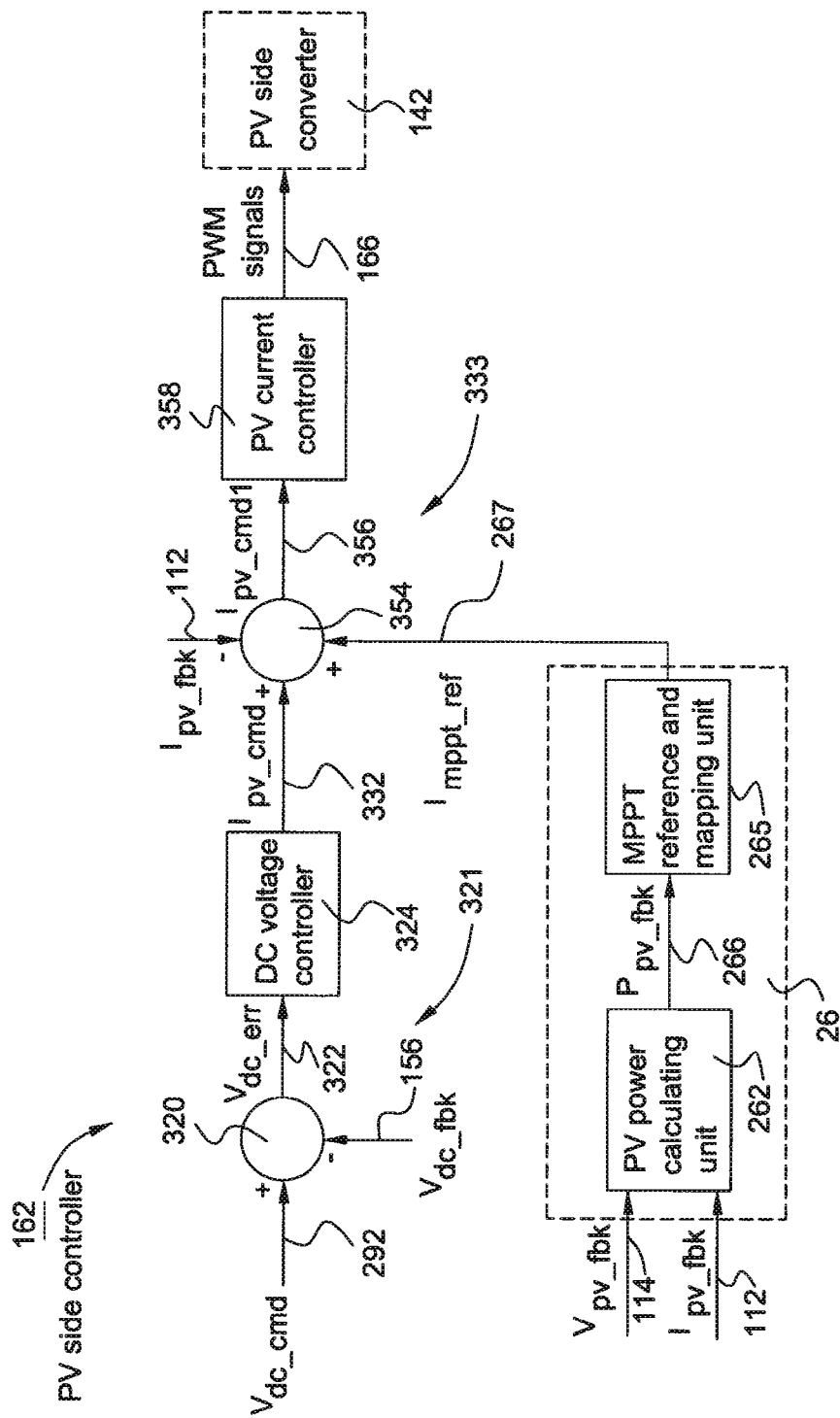
FIG. 8 is a detailed control diagram of a PV side controller shown in FIG. 1 in accordance with yet another exemplary embodiment of the present disclosure.

FIG. 8 illustrates a detailed control diagram of the PV side controller 162 shown in FIG. 1 in accordance with yet another embodiment of the present disclosure. In the embodiment of FIG. 8 an MPPT current reference signal 267 is used for feed-forward control instead of the MPPT power reference signal 268 as was described with respect to FIG. 7. More specifically, the MPPT current reference signal 267 is generated from an MPPT reference and mapping unit 265 of the MPPT circuit 26 according to the PV power feedback signal 266. Another difference is that the DC voltage controller 324 shown in FIG. 8 is configured for generating a PV current command signal 332 instead of a PV power command signal. The PV current command signal 332 is supplied to a summation element 354 for combination with the MPPT current reference signal 267, and a combined PV current command signal 356 is produced. The combined PV current command signal 356 is regulated by the PV current regulator 358 for generation of the PV side control signals 166 for the PV side converter 142.

Figure 9:
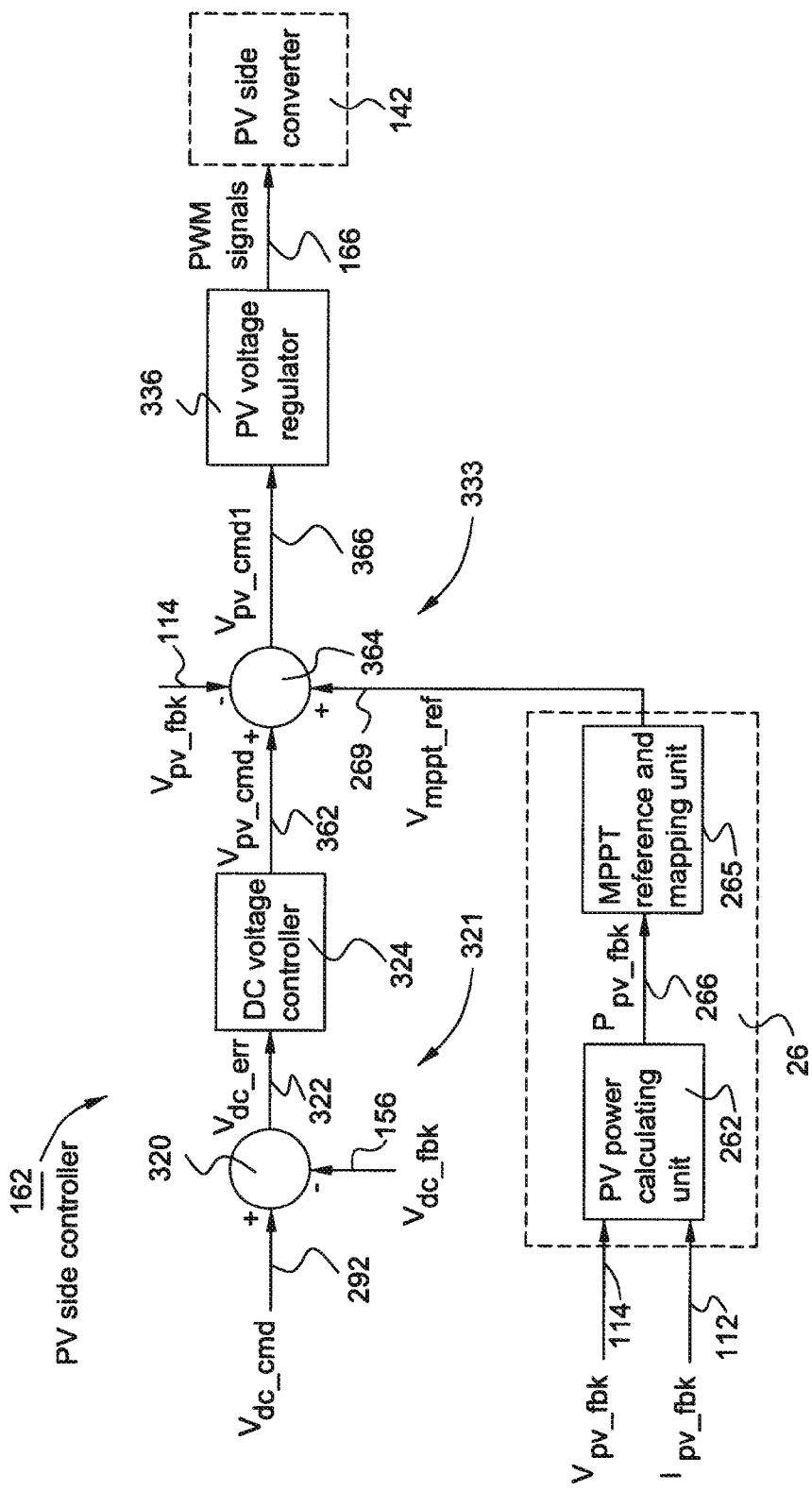
FIG. 9 is a detailed control diagram of a PV side controller shown in FIG. 1 in accordance with yet another exemplary embodiment of the present disclosure.

FIG. 9 illustrates a detailed control diagram of the PV side controller 162 shown in FIG. 1 in accordance with yet another embodiment of the present disclosure. The DC voltage controller 324 shown in FIG. 9 is configured for generating a PV voltage command signal 362 instead of a PV current or power command signal. Correspondingly, the MITT circuit 26 uses an MPPT reference and mapping unit 265 for supplying an MPPT voltage reference signal 269 to a summation element 364 for combination with the PV voltage command signal 362. The combined PV voltage command signal 366 is regulated by the PV voltage regulator 336 for generation of the PV side control signals 166 for the PV side converter 142.

Figure 10:
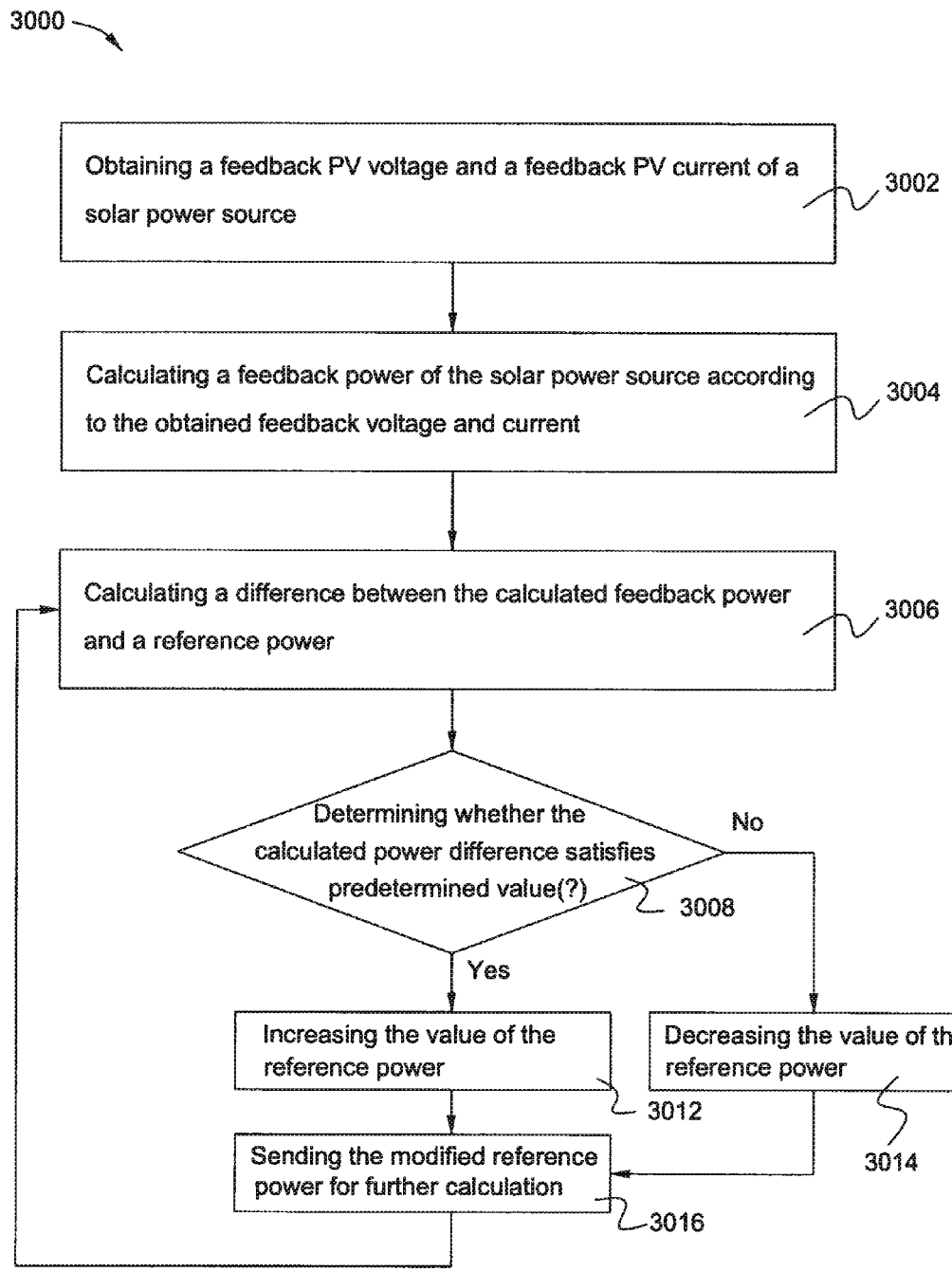
FIG. 10 is a flowchart of a method for improved implementation of maximum power point tracking for a solar power conversion system in accordance with an exemplary embodiment of the present disclosure.

FIG. 10 illustrates a flowchart of a method for tracking an optimum operating point of a solar power source where maximum power can be extracted in accordance with an exemplary embodiment. The method 3000 may be programmed with software instructions stored in a computer-readable medium, which when executed by a processor, perform various steps of the method 3000. The computer-readable medium may include volatile and nonvolatile, removable and non-removable media implemented in any method or technology. The computer-readable medium includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information and which can be accessed by an instruction execution system.

In one implementation, the method 3000 may begin at block 3002. At block 3002, a feedback PV voltage signal 114 and a feedback PV current signal 112 of a solar power source 12 (see FIG. 1) are obtained. In one implementation, the feedback PV voltage signal 114 and the feedback PV current signal 112 are DC signals and are obtained by a current sensor 28 and a voltage sensor 32 (see FIG. 1) respectively.

At block 3004, a feedback PV power of the solar power source 12 is calculated. In one implementation, the feedback PV power of the solar power source 12 is calculated by multiplying the feedback PV voltage signal 114 and the feedback PV current signal 112 obtained at block 3002.

At block 3006, a difference between the calculated feedback PV power and a reference PV power is calculated. In one implementation, the reference PV power may be stored in a memory element in association with the MPPT circuit 26 and represents the expected PV power to be extracted from the solar power source 12. In one embodiment, an absolute difference value between the calculated feedback PV power and the reference PV power is calculated at block 3006.

At block 3008, a determination is made as to whether the power difference calculated at block 3006 satisfies a predetermined criterion. In one implementation, the calculated power difference is determined if it is smaller than a threshold value. If the calculated power difference is smaller than the threshold value, it indicates that the currently obtained PV feedback power follows the previous reference power, and the power reference signal should be increased. Following this positive determination, the procedure goes to block 3012. If the calculated power difference is larger than the threshold value, it indicates that the currently obtained PV feedback power fails to follow the previous reference power, and the power reference signal should be decreased. Following this negative determination, the procedure then goes to block 3014.

Figure 11:
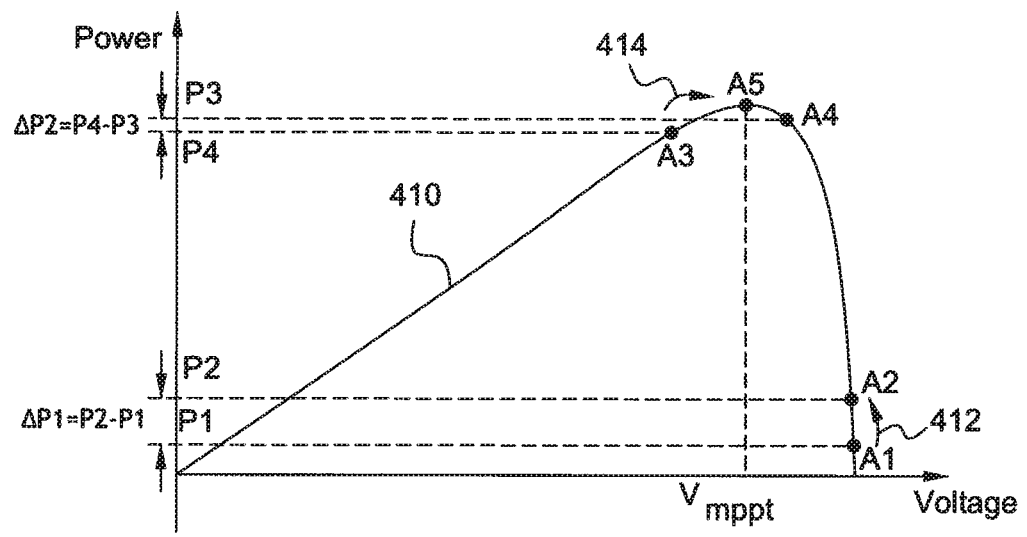
FIG. 11 is a graph illustrating PV power versus PV voltage of a solar power source in accordance with an exemplary embodiment of the present disclosure.

At block 3012, the reference power signal is updated by increasing a predetermined power step value. In one embodiment, the predetermined power step value is fixed. In other embodiments, the predetermined power step value may be variable. Referring to FIG. 11, a curve 410 of PV power as a function of PV voltage is illustrated. The curve 410 has an optimum operating point at $A_5$ where maxim power can be extracted from the solar power source 12. In a first case, the solar power source 10 may start from a first operating point $A_1$ at the right side of the curve 410. At the first operating point $A_1$, the solar power source 12 has an actual PV power of $P_1$. Because the first operating point $A_1$ is located far from optimum operating point $A_5$, to reduce the search time, a first power step $\Delta P_1$ having a relatively larger value can be used to make a power perturbation. That is, the reference power signal is updated by adding actual PV power of $P_1$ with the first power step. As indicated by arrow 412, the operating point can move from $A_1$ to $A_2$ after power perturbation with the first power step. In a second case, the solar power source 12 may start at a third operating point $A_3$ at the left side of the graph 410. At the third operating point $A_3$, the solar power source 12 has an actual PV power of $P_3$. Because the third operating point $A_3$ is located near to the optimum operating point $A_5$, to avoid problem of oscillation around the optimum operating point $A_5$, a second power step $\Delta P_2$ having a relatively smaller value is used to add with the actual PV power of $P_2$ to get a new reference power signal. As indicated by arrow 414, the operating point can move from $A_3$ to $A_4$ after power perturbation with the second power step.

At block 3014, the reference power signal is updated by decreasing a predetermined power step value. Similarly as described above at block 3012, the predetermined power step value can be fixed or variable depending on practical requirements such as search time and accuracy requirements. More specifically, the reference power signal is generated by subtracting a predetermined power step value from the currently obtained feedback PV power.

At block 3016, the updated reference power signal is transmitted to block 3006 for further power difference calculations.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A power conversion system comprising:
    a maximum power point tracking (MPPT) unit for receiving a feedback current signal and a feedback voltage signal from a power source and generating an MPPT reference signal based at least in part on the feedback current signal and the feedback voltage signal;
    a DC bus for receiving DC power from the power source;
    a power converter for converting the DC power on the DC bus to alternating current (AC) power, the power converter comprising:
        a source side converter for receiving AC or DC power from the power source and converting that AC or DC power to provide the DC power on the DC bus; and
    a converter controller for:
        receiving the MPPT reference signal from the MPPT unit and an output power feedback signal measured at an output of the power converter;
        generating control signals for AC power regulation and maximum power extraction based at least in part on the MPPT reference signal and the output power feedback signal; and
        sending the control signals to the power converter, wherein the converter controller comprises:
            a source side controller configured to generate control signals for the source side converter based at least in part on a DC bus voltage feedback signal measured on the DC bus and a DC bus voltage command signal, said side source controller comprising:
                a DC voltage controller for generating a power command signal based on a difference between the DC bus voltage feedback signal and the DC bus voltage command signal;
                a mapping unit for mapping a current command signal according to the power command signal; and
                a current regulator for generating the control signals for the source side converter based on a difference between the current command signal and the feedback current signal.

2. A power conversion system comprising:
    a maximum power point tracking (MPPT) unit for receiving a feedback current signal and a feedback voltage signal from a power source and generating an MPPT reference signal based at least in part on the feedback current signal and the feedback voltage signal;
    a DC bus for receiving DC power from the power source;
    a power converter for converting the DC power on the DC bus to alternating current (AC) power, wherein the power converter comprises a line side converter for converting the DC power on the DC bus to the AC power; and
    a converter controller for:
        receiving the MPPT reference signal from the MPPT unit and an output power feedback signal measured at an output of the power converter;
        generating control signals for AC power regulation and maximum power extraction based at least in part on the MPPT reference signal and the output power feedback signal; and
        sending the control signals to the power converter;
    wherein the converter controller comprises a line side controller for generating an internal frequency command signal based at least in part on the MPPT reference signal and the output power feedback signal, generating a phase angle command signal by integrating the internal frequency command signal, and using the phase angle command signal to generate at least some of the control signals, wherein the at least some of the control signals are for control of the line side converter.

3. The power conversion system of claim 2, wherein the MPPT unit comprises:
    a power calculating unit for receiving the feedback current signal and the feedback voltage signal and calculating a source power feedback signal of the power source by multiplying the feedback current signal and the feedback voltage signal; and
    an MPPT reference unit for receiving the source power feedback signal and generating an MPPT power reference signal by comparing the source power feedback signal with a previously referenced power signal, wherein the line side controller is further configured to use the MPPT power reference signal when generating the control signals for the line side converter.

4. The power conversion system of claim 2, wherein the MPPT unit comprises:
    a power calculating unit for receiving the feedback current signal and the feedback voltage signal and calculating a source power feedback signal of the power source by multiplying the feedback current signal and the feedback voltage signal; and
    an MPPT reference and mapping unit for receiving the source power feedback signal and generating an MPPT current reference signal according to the source power feedback signal; and
    wherein the line side controller further comprises a multiplication element for generating an MPPT power reference signal by multiplying the MPPT current reference signal with the feedback voltage signal, wherein the line side controller is further configured to use the MPPT power reference signal when generating the control signals for the line side converter.

5. The power conversion system of claim 2, wherein the MPPT unit comprises:
   a power calculating unit for receiving the feedback current signal and the feedback voltage signal and calculating a source power feedback signal of the power source by multiplying the feedback current signal and the feedback voltage signal; and
   an MPPT reference and mapping unit for receiving the feedback power signal and generating an MPPT voltage reference signal according to the source power feedback signal; and
   wherein the line side controller further comprises a multiplication element for generating an MPPT power reference signal by multiplying the MPPT voltage reference signal with the feedback current signal, wherein the line side controller is further configured to use the MPPT power reference signal when generating the control signals for the line side converter.

6. The power conversion system of claim 1, wherein the MPPT unit comprises:
   a power calculating unit for receiving the feedback current signal and the feedback voltage signal and calculating a source power feedback signal of the power source by multiplying the feedback current signal and the feedback voltage signal; and
   an MPPT reference unit for receiving the source power feedback signal, and generating an MPPT power reference signal by comparing the source power feedback signal with a previously referenced power signal;
   wherein the source side controller further comprises a summation element for combining the MPPT power reference signal with the power command signal for mapping the current command signal.

7. The power conversion system of claim 1, wherein the MPPT unit comprises:
   a power calculating unit for receiving the feedback current signal and the feedback voltage signal and calculating a source power feedback signal of the power source by multiplying the feedback current signal and the feedback voltage signal; and
   an MPPT reference and mapping unit for receiving the source power feedback signal and generating an MPPT current reference signal according to the source power feedback signal;
   wherein the source side controller further comprises a summation element for combining the MPPT current reference signal with the current command signal and subtracting the feedback current signal before providing the difference to the current regulator.

8. The power conversion system of claim 1, wherein the source side controller comprises:
   a DC voltage controller for generating a voltage command signal based on a difference between the DC bus voltage feedback signal and the DC bus voltage command signal; and
   a voltage controller for generating the control signals for the source side converter based on a difference between the voltage command signal and the feedback voltage signal.

9. The power conversion system of claim 8, wherein the MPPT unit comprises:
   a power calculating unit for receiving the feedback current signal and the feedback voltage signal and calculating a source power feedback signal of the power source by multiplying the feedback current signal and the feedback voltage signal; and
   an MPPT reference and mapping unit for receiving the source power feedback signal and generating an MPPT voltage reference signal according to the source power feedback signal;
   wherein the source side controller further comprises a summation element for combining the MPPT voltage reference signal with the voltage command signal and subtracting the feedback voltage signal before providing the difference to the voltage regulator.

10. A method of operating a power conversion system comprising:
    generating a maximum power point tracking (MPPT) reference signal based at least in part on a feedback current signal and a feedback voltage signal measured at an output of a power source, comprising:
       calculating a source power feedback signal of the power source by multiplying the feedback current signal and the feedback voltage signal;
       generating an MPPT power reference signal according to the source power feedback signal, comprising;
          comparing the calculated source power feedback signal with a previously referenced power signal;
          determining whether a difference between the calculated source power feedback signal and the previously referenced power signal satisfies a threshold value; and
          generating the MPPT power reference signal by increasing the calculated source power feedback signal by a predetermined step value upon determination that the difference between the calculated source power feedback signal and the previously referenced power signal satisfies the threshold value; and
          generating the MPPT power reference signal by decreasing the calculated source power feedback signal by a predetermined step value upon determination that the difference between the calculated source power feedback signal and the previously referenced power signal does not satisfy the threshold value;
    generating control signals based at least in part on the MPPT reference signal and an output power feedback signal measured at an output of the power conversion system; and
    applying the control signals to a line side converter of the power conversion system to enable maximum power to be extracted from the power source while mitigating power imbalance conditions, and for AC power regulation.

11. A solar power conversion system comprising:
    a maximum power point tracking (MPPT) unit for receiving a feedback current signal and a feedback voltage signal from a photovoltaic (PV) power source and generating an MPPT reference signal based at least in part on the feedback current signal and the feedback voltage signal, wherein generating said MPPT reference signal comprises:
       calculating a source power feedback signal of the power source by multiplying the feedback current signal and the feedback voltage signal;
       generating the MPPT power reference signal according to the source power feedback signal, comprising;
          comparing the calculated source power feedback signal with a previously referenced power signal;
          determining whether a difference between the calculated source power feedback signal and the previously referenced power signal satisfies a threshold value; and generating the MPPT power reference signal by increasing the calculated source power feedback signal by a predetermined step value upon determination that the difference between the calculated source power feedback signal and the previously referenced power signal satisfies the threshold value; and generating the MPPT power reference signal by decreasing the calculated source power feedback signal by a predetermined step value upon determination that the difference between the calculated source power feedback signal and the previously referenced power signal does not satisfy the threshold value;

a DC bus for receiving DC power from the PV power source;

a line side converter coupled to the DC bus for converting the DC power on the DC bus to the AC power; and a line side controller for:

generating control signals for AC power regulation and maximum power extraction based at least in part on the MPPT reference signal and an output power feedback signal measured at an output of the line side converter; and supplying the control signals to the line side converter.

12. The solar power conversion system of claim 11, further comprising a source side converter and a source side controller for generating control signals to regulate the DC power converted by the source side converter based at least in part on the MPPT reference signal, a DC bus voltage feedback signal measured on the DC bus, and a DC bus voltage command signal, and supplying the control signals to the source side converter.

13. The power conversion system of claim 2, wherein the line side controller is further configured for generating additional control signals for the line side converter based at least in part on a DC bus voltage feedback signal measured on the DC bus and a DC bus voltage command signal.

14. A method of operating a power conversion system comprising:

generating a maximum power point tracking (MPPT) reference signal based at least in part on a feedback current signal and a feedback voltage signal measured at an output of a power source;

generating control signals based at least in part on the MPPT reference signal and an output power feedback signal measured at an output of the power conversion system; and applying the control signals to a power converter of the power conversion system to enable maximum power to be extracted from the power source while mitigating power imbalance conditions;

the method further comprising:

calculating a source power feedback signal of the power source by multiplying the feedback current signal and the feedback voltage signal;

generating an MPPT power reference signal according to the source power feedback signal; and using the MPPT power reference signal to generate control signals for a source side converter of the power conversion system.

* * * * *